(12) United States Patent
Kim

(10) Patent No.: US 6,721,472 B2
(45) Date of Patent: Apr. 13, 2004

(54) OPTICAL SWITCH

(75) Inventor: Sung-chul Kim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 114 days.

(21) Appl. No.: 09/962,848

(22) Filed: Sep. 26, 2001

(65) Prior Publication Data

US 2002/0122618 A1 Sep. 5, 2002

(30) Foreign Application Priority Data

Jan. 17, 2001 (KR) .......................... 2001-2627

(51) Int. Cl.[7] .................................. G02B 6/26
(52) U.S. Cl. ........................................ 385/16
(58) Field of Search .................. 385/16, 17, 14, 385/33

(56) References Cited

U.S. PATENT DOCUMENTS 3,085,469 A * 4/1963 Carlson
3,529,156 A * 9/1970 Fergason et al.
4,848,879 A * 7/1989 Nishimura et al. ......... 350/353

FOREIGN PATENT DOCUMENTS

JP  8-201856  8/1996

* cited by examiner

Primary Examiner—Khiem Nguyen
(74) Attorney, Agent, or Firm—Staas & Halsey LLP

(57) ABSTRACT

An optical switch having substrates; waveguides through which an optical signal is transmitted, the waveguides being arranged in the form of matrix between the substrates and having at least one cross point; cells, each containing liquid and arranged at each cross point of the waveguides; and a laser heating apparatus having lasers corresponding to the respective cells, to selectively heat the liquid.

22 Claims, 4 Drawing Sheets

OPTICAL SWITCH

CROSS-REFERENCE TO RELATED APPLICATIONS

This application claims the benefit of Korean Patent Application No. 2001-2627 filed on Jan. 17, 2001, in the Korean Industrial Property Office, the disclosure of which is incorporated herein by reference.

BACKGROUND OF THE INVENTION

1. Field of the Invention

The present invention relates to an optical switch, and more particularly, to an optical switch which can control a proceeding direction of an optical signal by heating liquid with the use of a laser heating unit so that the liquid can move into or out of the path of the optical signal.

2. Description of the Related Art

An optical switch is used to transmit a particular optical signal among many optical signals for various channels to a channel in a desired direction in an optical communications system, in particular, in an optical communications system adopting a wavelength division multiplexing method. In this type of optical communications system, waveguides cross perpendicular to each other, and a cell capable of containing liquid is provided at the cross point of the waveguides to be angled with respect to the waveguides. To perform a switching operation, there are methods of generating air bubbles in the liquid in the cell and moving the liquid in the cell by using a change in surface tension according to a difference in temperature at a boundary surface of air.

Referring to FIGS. 1 and 2, in a conventional optical switch, waveguides 103 are arranged in the form of an N×M matrix on a substrate 100. A cell 110 containing liquid 105 is diagonally installed at a cross point 103a of the waveguides 103. A heater 115 that heats the liquid 105 is installed on the substrate 100 together with the waveguides 103. Here, the cell 110 includes a head portion 110a where the liquid 105 is contained and a tail portion 110b disposed at the cross point 103a.

The operation of the optical switch having the above structure is described with reference to FIG. 2. First, when an optical signal is to be transmitted, the heater 115 heats the liquid 105. Then, the surface tension of a boundary surface between the liquid 105 and air decreases so that the liquid 105 moves toward the tail portion 110b of the cell 110. Since the optical switch is a micro device, a force mainly applied to the liquid 105 is not gravity but surface tension so that the surface tension greatly affects the movement of the liquid 105. Also, since the surface tension has the feature of being inversely proportional to a temperature and an electric field, when heat is applied to the liquid 105, the surface tension decreases and the liquid 105 moves in a direction in which the surface tension decreases.

When the liquid 105 moves toward the tail portion 110b of the cell 110, an optical signal passes through the liquid 105 and proceeds forward. Here, the liquid 105 having a refractive index the same as or similar to that of the waveguides 103 is used so that when the optical signal meets the liquid 105, the optical signal is hardly reflected and passes through the liquid 105.

To reflect the optical signal, heating by the heater 115 is stopped to increase the surface tension between the liquid 105 and air so that the liquid 105 moves toward the head portion 110a of the cell 110. When an optical signal is input after the liquid 105 completely moves toward the head portion 110a from the tail portion 110b, the optical signal is totally reflected by the cell 110. Here, since the gas inside the cell 110 has a refractive index less than that of the waveguides 103, an optical signal input at a predetermined angle or more can be total-reflected. For example, the liquid 105 of a cell (A) in row 3, column 2 and a cell (B) in row 2, column 3, is heated to move the liquid toward the tail portion 110b so that an optical signal passes through the two cells. At the same time, the liquid 105 in the remaining cells is not heated, and therefore the liquid stays at the head portion 110a of the cell 110 so that the optical signal is total-reflected and can be alternatively transmitted along a desired path. Thus, the optical signal input is directed toward a cell in row 3, column 1, as shown in FIG. 2, is total-reflected at this cross point, and passes through the cell (A) in row 3, column 2 and is then output to a desired channel after a predetermined number of transmissions and total reflections.

Accordingly, an optical signal can be transmitted to a channel in a desired direction by transmitting or total reflecting the optical signal. However, in the above optical switch, since the heater 115 that heats liquid is manufactured together with the cell 110 on the substrate 100 where the waveguides 103 are formed, if any of the heaters 115 do not work during the operation of the optical switch, the entire optical switch cannot be used due to that malfunctioning heater 115, which results in inefficiency and increased costs in optical manufacturing. There is another method of heating the liquid by applying a voltage thereto instead of using the heater. This method also has the same problems. Further, since the optical switch is configured in the form of an N×M matrix, which is not a simple form, installing the waveguides, heaters, and cells together on the substrate requires a very accurate and complicated manufacturing process, thus reducing productivity.

SUMMARY OF THE INVENTION

Accordingly, it is an object of the present invention to provide an optical switch in which liquid is heated by using laser heating units that are installed in a separable manner from the substrate where waveguides are provided, so that, when any of the lasers within the laser heating units does not work, only the malfunctioning laser heating unit needs to be replaced rather than the whole optical switch.

Additional objects and advantages of the invention will be set forth in part in the description which follows and, in part, will be obvious from the description, or may be learned by practice of the invention.

The foregoing and other objects of the present invention are achieved by providing: optical switch substrates; waveguides through which an optical signal is transmitted, the waveguides being arranged in the form of a matrix between the substrates and having at least one cross point; cells, each containing liquid and arranged at each cross point of the waveguides; and a laser heating unit having lasers corresponding to the respective cells to selectively heating the liquid in each cell.

The above and other objects of the present invention may also be achieved by providing a microlens array between the cells and the lasers corresponding to each of the cells so that light emitted from each of the lasers is focused on each cell.

The above and other objects of the present invention may be achieved by providing that the laser heating unit is installed to be detachable from the substrates.

BRIEF DESCRIPTION OF THE DRAWINGS

These and other objects and advantages of the present invention will become more apparent and more readily appreciated from the following description of the preferred embodiments, taken in conjunction with the accompany drawings in which.

DETAILED DESCRIPTION OF THE PREFERRED EMBODIMENTS

Figure 1:
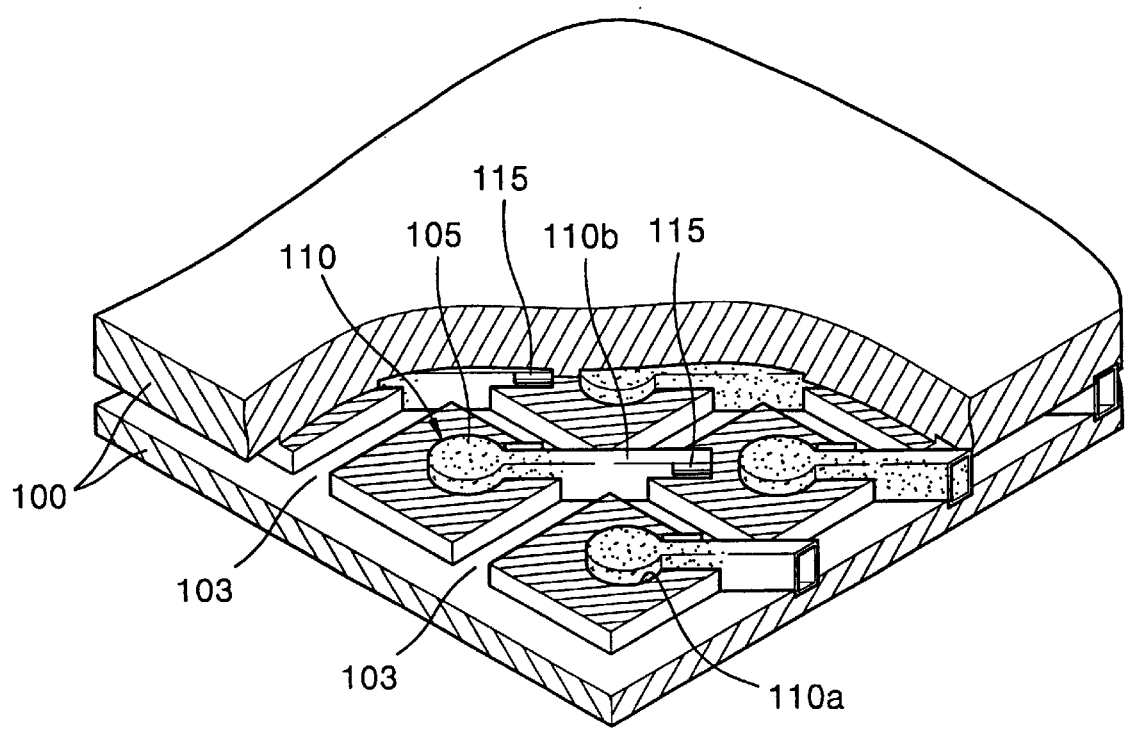
FIG. 1 is a perspective view showing the conventional optical switch in the form of matrix.
Figure 2:
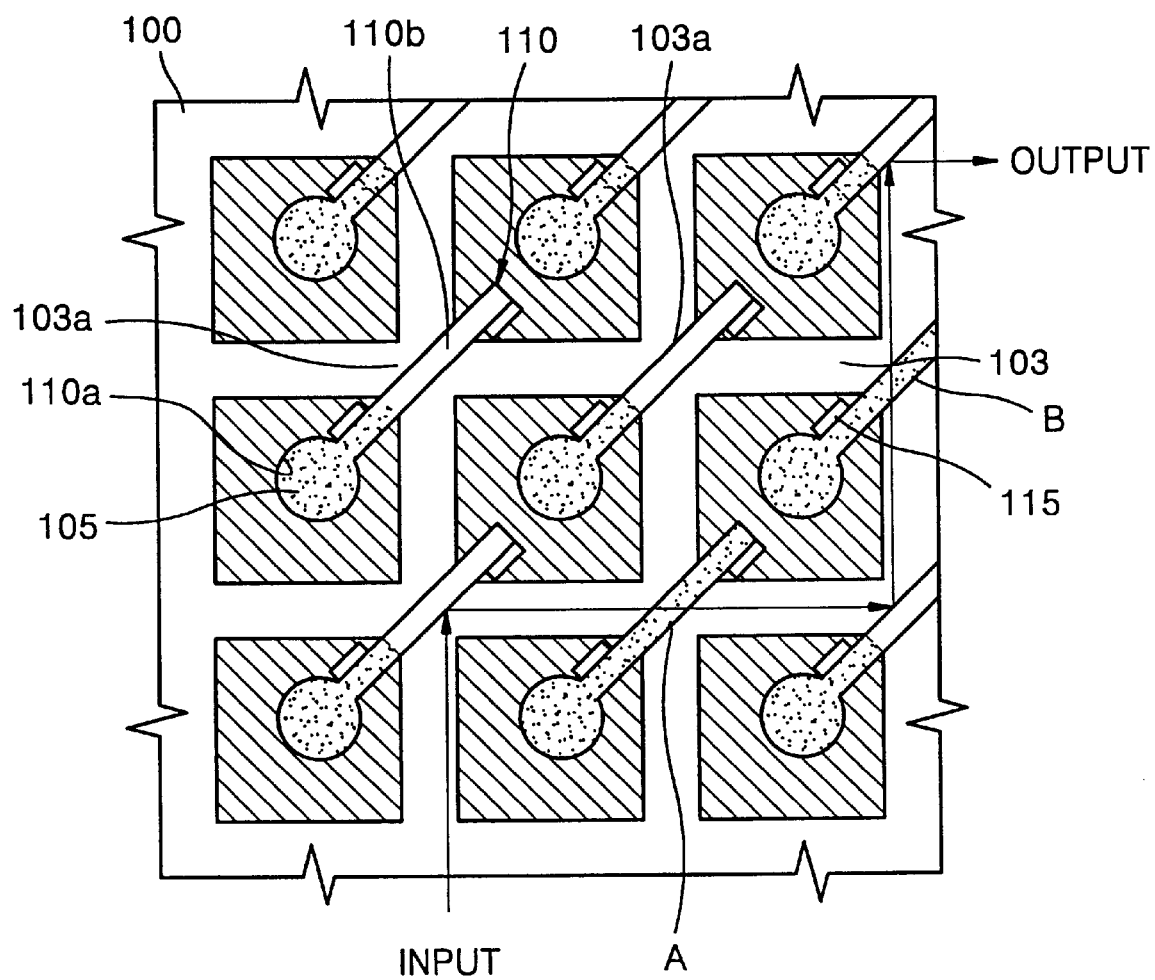
FIG. 2 is a plan view showing the operation of the conventional optical switch.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 3:
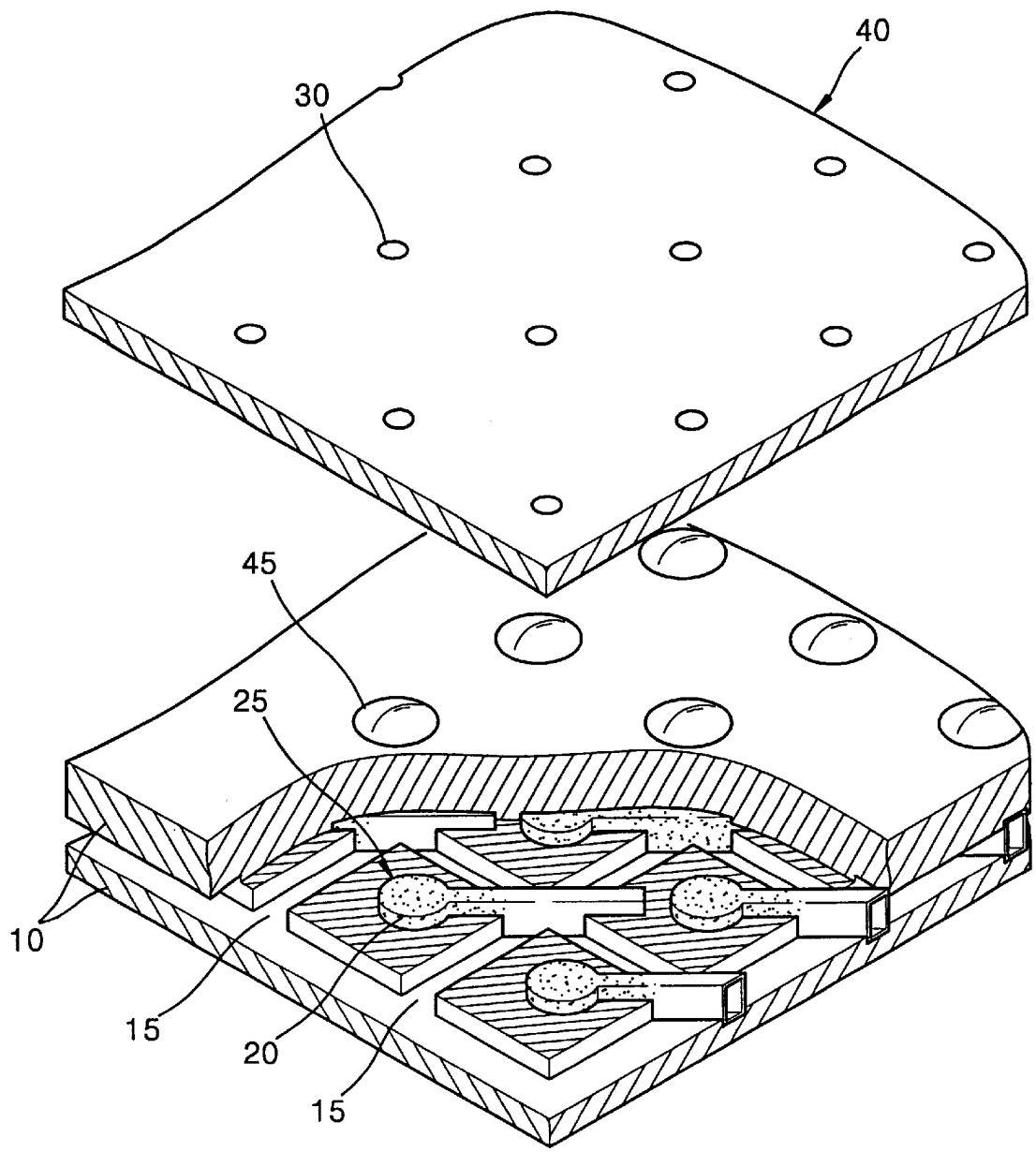
FIG. 3 is a partially cut-away perspective view of an optical switch according to the present invention.

Referring to FIG. 3, an optical switch according to the present invention includes a pair of substrates 10, a plurality of waveguides 15 arranged in the form of a matrix and having cross points 15a (see FIG. 4) to transmit an optical signal, a plurality of cells 25, each containing liquid 20 and arranged at each of the cross points 15a of the waveguides 15, and a laser heating unit 40 having a plurality of lasers 30, each being disposed at a position corresponding to each of the cells 25.

Figure 4:
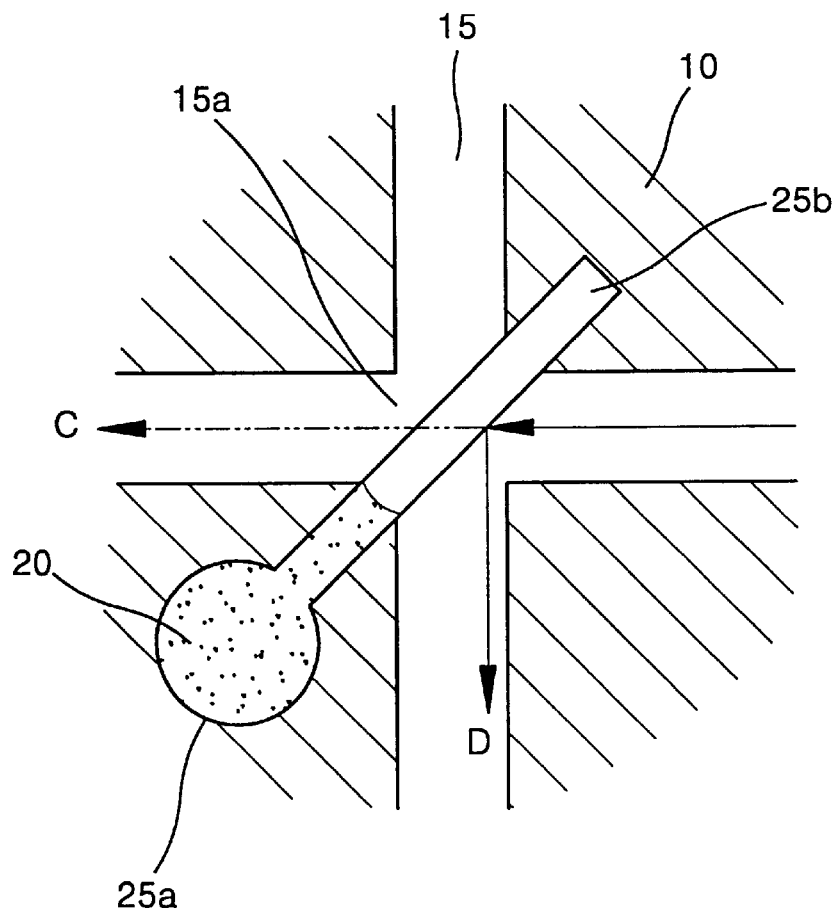
FIG. 4 is a view showing the operation of the optical switch according to the present invention.

Here, as shown in FIG. 4, each of the cells 25 includes a head portion 25a where the liquid 20 is stored in a state in which the liquid 20 is not heated, and a tail portion 25b diagonally disposed at each of the cross points 15a to totally reflect or transmit an optical signal. For example, when the liquid 20 is stored in the head portion 25a only, not in the tail portion 25b, an optical signal input to the tail portion 25b is total-reflected in a direction D. In contrast, when the liquid 20 is stored in the tail portion 25b, an input optical signal passes through the cell 25 and proceeds in a direction C.

Figure 5:
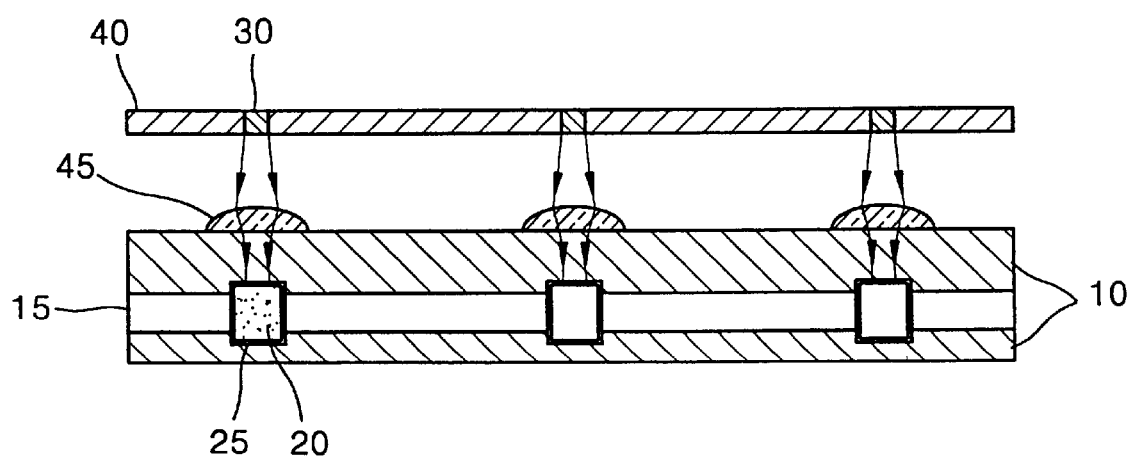
FIG. 5 is a sectional view showing the optical switch according to the present invention.

The laser heating unit 40, as shown in FIGS. 3 and 5, includes lasers 30 corresponding to each cell 25 and arranged in the form of a matrix to respectively correspond to the cells 25 so that the respective lasers 30 can focus on each respective cell 25. Here, a vertical cavity surface emitting semiconductor laser or an edge emitting semiconductor laser is used as the lasers 30. Alternatively, any appropriate lasers may be used that provide the feature of heating and moving the liquid within the cells 25. Since the vertical cavity surface emitting semiconductor laser is easy to manufacture and exhibits a superior heating feature, it is advantageous in view of optical transmission speed.

In addition to the lasers 30, a microlens array 45 focusing light emitted from the laser 30 may further be provided between the laser 30 and the cell 25 corresponding thereto. The microlens array 45 is manufactured in a MEMS (micro electric mechanical system) process so that a loss of energy can be reduced by increasing the concentration efficiency of the laser 30.

In the transmission of an optical signal by using the optical switch having the above structure, a path of the waveguides 15 along which an optical signal is transmitted is determined, and cells 25 used to total reflect or transmit the optical signal are determined. Next, the cell used to transmit the optical signal is heated by the laser 30 disposed in a position to correspond to that cell 25. Then, the surface tension of the liquid 20 in the cell 25 is lowered and the liquid 20 is moved toward the tail portion 25b. When the laser 30 is turned off and the liquid 20 is moved toward the head portion 25a, the optical signal input into the waveguide 15 and directed toward the cell 25 is total-reflected. The liquid 20 has a refractive index the same as or similar to that of the waveguides 15. Also, gas in the cell 25 has a refractive index less than that of the waveguides 15, and thus the incident angle of the optical signal is determined by considering the critical angle for total reflection. For example, ethyl alcohol has a refractive index of about 1.3, a specific heat of 2.41 (J/g° C.), and a specific gravity of 0.8 (kg/l). When a vertical cavity surface emitting laser is used as the laser to heat the liquid 20, assuming that power is about 2 mW and the volume of the cell is 20 $\mu$m×10 $\mu$m×50 $\mu$m, the weight of the liquid is $10\times10^{-12}\times0.8=(8\times10^{-9}$ g). When the liquid is heated up to the boiling point of 78.3° C. to sufficiently weaken the surface tension of the ethyl alcohol having the above weight, the following energy E is needed.

$$E = \Delta T \times m \times h \quad \{\text{Equation 1}\}$$
$$= 60 \times 8 \times 10^{-9} \times 2.41$$
$$= 1.1568 \times 10^{-6} (J)$$

If the diameter of a beam is 10 $\mu$m when the output of a vertical cavity surface emitting semiconductor laser, having an output power of about 2 mW, is focused by using a microlens, the time (t) needed for obtaining the above energy is as follows $$t = \frac{1.1568 \times 10^{-6}(J)}{2 \times 10^{-3}(J/S)} \quad \{\text{Equation 2}\}$$
$$= 5.784 \times 10^{-4}(s)$$

The ethyl alcohol is just an example, and alternatively, various types of liquids can be selected and used according to the refractive index of the waveguides 15. The gas occupying an empty space of the cell 25 should have a refractive index less than that of the waveguides 15 to perform the switching operation. An optical signal to be input must be chosen considering the critical angle for total reflection so that the optical signal can be total-reflected, and therefore the type of laser used should be one chosen in consideration of the type of liquid and gas within the cells.

As described above, in the optical switch according to the present invention, since the liquid can be moved by using the laser heating unit, the optical signal can selectively be transmitted or total-reflected at each cell so that the optical signal can be transmitted to a desired channel. Here, the laser heating unit 40 is provided separately from the substrate where the waveguides are provided so that the manufacturing process is simplified. Also, when part of the laser heating unit 40 is out of order, only the laser heating units need to be replaced, without a need to replace the entire optical switch, which is very advantageous in recycling.

Although preferred embodiments of the present invention have been shown and described, it will be appreciated by those skilled in the art that changes may be made in these embodiments without department from the principle and spirit of the invention, the scope of which is defined in the appended claims and their equivalents.

What is claimed is:

1. An optical switch comprising:

substrates;

waveguides through which an optical signal is transmitted, the waveguides being arranged in the form of a matrix between the substrates and having at least one cross point;

cells, each containing liquid and arranged at each cross point of the waveguides; and a laser heating unit having lasers corresponding to the respective cells to permit light to selectively heat the liquid.

2. The optical switch as claimed in claim 1, further comprising a microlens array between the cells and the lasers and corresponding to each of the cells, to focus the light emitted from each of the lasers on the respective cells.

3. The optical switch as claimed in claim 2, wherein the lasers are vertical cavity surface emitting semiconductor lasers.

4. The optical switch as claimed in claim 2, wherein the laser heating unit is detachable from the substrates.

5. The optical switch as claimed in claim 1, wherein the lasers are vertical cavity surface emitting semiconductor lasers.

6. The optical switch as claimed in claim 1, wherein the laser heating unit is detachable from the substrates.

7. The optical switch according to claim 1, wherein said cells each comprise a head portion where the liquid is stored in a non-heated state, and a tail portion where the liquid is stored in a heated state.

8. The optical switch according to claim 1, wherein the liquid has a refractive index that is substantially the same as the refractive index of the waveguides.

9. The optical switch according to claim 1, wherein the cells contain gas having a refractive index that is less than the refractive index of the waveguides.

10. The optical switch according to claim 3, wherein when the liquid is heated up to the boiling point of 78.3 degrees C., the energy (E) needed is determined by:

$$E = \Delta T \times m \times h$$
$$= 60 \times 8 \times 10^{-9} \times 2.41$$
$$= 1.1568 \times 10^{-6} (J).$$

11. The optical switch according to claim 10, wherein when the diameter of a beam of the vertical cavity surface emitting semiconductor lasers is 10 micrometers, and the output of the vertical cavity surface emitting semiconductor lasers have an output power of 2 milliwatts, and the beam is focused by using said microlens array, the time (t) needed for obtaining the (E) is determined by:

$$t = \frac{1.1568 \times 10^{-6} (J)}{2 \times 10^{-3} (J/S)}$$
$$= 5.784 \times 10^{-4} (s).$$

12. The optical switch according to claim 9, wherein the gas is ethyl alcohol.

13. The optical switch as claimed in claim 2, wherein the lasers are edge emitting semiconductor lasers.

14. The optical switch as claimed in claim 1, wherein the lasers are edge emitting semiconductor lasers.

15. The optical switch as claimed in claim 2, wherein the microlens array is manufactured according to a micro electric mechanical system process.

16. The optical switch as claimed in claim 2, wherein:

one of the substrates is formed between the laser heating unit and the waveguides; and the microlens array is formed on a surface of the one substrate facing the laser heating unit.

17. An optical switch comprising:

waveguides through which an optical signal is transmitted, the waveguides having at least one cross point;

cells, each containing liquid and arranged at each cross point of the waveguides; and a laser heating unit having lasers corresponding to the respective cells to selectively heat the liquid.

18. An optical switch comprising:

a first substrate;

waveguides through which an optical signal is transmitted, the waveguides being arranged in the form of a matrix on the first substrate and having at least one cross point;

cells, each containing liquid and arranged at each cross point of the waveguides; and a laser heating unit to selectively heat the liquid of the cells, the laser heating unit being spaced apart from the first substrate.

19. The optical switch as claimed in claim 18, wherein the laser heating unit is spaced apart from the waveguides and the cells.

20. The optical switch as claimed in claim 18, further comprising a second substrate, wherein the waveguides and cells are between the first and second substrates, and the laser heating unit is at a side of the second substrate opposite to that facing the first substrate.

21. The optical switch as claimed in claim 20, wherein the laser heating unit is spaced apart from the second substrate.

22. The optical switch as claimed in claim 21, wherein:

the laser heating unit comprises a plurality of lasers respectively corresponding to the cells, the lasers emitting light to heat the liquid of the respective cells; and the optical switch further comprising a microlens array formed on a surface of the second substrate facing the laser heating unit and having microlenses respectively corresponding to the lasers, wherein the microlenses focus the light emitted by the lasers on the respective cells.

* * * * *